United States Patent [19]

Baldus

[11] Patent Number: 5,543,485
[45] Date of Patent: Aug. 6, 1996

[54] PROCESS FOR THE PRODUCTION OF PRECERAMIC POLYBOROSILAZANES AND CERAMIC MATERIAL DERIVED THEREFORM

[75] Inventor: Hans-Peter Baldus, Leverkusen, Germany

[73] Assignee: Bayer AG, Leverkusen, Germany

[21] Appl. No.: 353,625

[22] Filed: Dec. 12, 1994

[30] Foreign Application Priority Data

Dec. 23, 1993 [DE] Germany .......................... 43 44 161.0
Feb. 8, 1994 [DE] Germany .......................... 44 03 839.9

[51] Int. Cl.$^6$ .................................................. C08G 77/56
[52] U.S. Cl. ................................. 528/5; 528/7; 501/97
[58] Field of Search ............................. 528/5, 7; 501/97

[56] References Cited

U.S. PATENT DOCUMENTS 5,128,286  7/1992  Funayama et al. ..................... 528/4
5,233,066  8/1993  Jansen ..................................... 556/402

FOREIGN PATENT DOCUMENTS 4107108  9/1992  Germany .

OTHER PUBLICATIONS

Orbit Abstract of DE 41 07 108 (Sep. 10, 1992).
Chemical Abstracts, vol. 120, No. 10, Mar. 7, 1994, Abstract No. 114282, Materials Research Society Symposia Proceedings, Bd. 271, 1992 Boston, pp. 821–826, H. P. Baldus et al., "Synthesis of Advanced Ceramics in the Systems Silicon-–Boron–Nitrogen".

*Primary Examiner*—Melvyn I. Marquis
*Attorney, Agent, or Firm*—Connolly and Hutz

[57] ABSTRACT

The present invention relates to novel preceramic oligo- or polyborosilazane compounds having the structural feature Si—N—B, and to a ceramic material based on SiN and BN, to a process for the production thereof and to the use of the polyborosilazanes and the ceramic materials.

9 Claims, No Drawings

PROCESS FOR THE PRODUCTION OF PRECERAMIC POLYBOROSILAZANES AND CERAMIC MATERIAL DERIVED THEREFORM

The present invention relates to novel preceramic olig-or polyborosilazane compounds having the structural feature Si—N—B, and to a ceramic material based on SiN and BN, to a process for the production thereof and to the use of the polyborosilazanes and the ceramic materials;

Thanks to their strength and corrosion resistance, the materials silicon nitride and silicon carbide are fundamentally well suited to ceramic turbochargers, jet engine turbines and as a lining for rocket nozzles and combustion chambers. In recent years, silicon-based polymeric preceramics have increasingly been used to produce these materials.

Such polymers are used inter alia for the production of ceramic mouldings, coatings and fibres. Shaping here proceeds in the polymeric state and the resultant moulding is transformed into a ceramic material by subsequent pyrolysis. These polymers are moreover used as binders and sintering auxiliaries in the production of ceramic components from powders, as a matrix material for composite components and for the infiltration of porous ceramics, such as for example reaction-bonded SiC.

Polymeric precursors for the production of silicon nitride, silicon carbonitride and silicon carbide are described in the U.S. Pat. Nos. 4,310,751, 4,312,970, 4,650,837, 4,639,501, 4,482,669, 4,780,337, 4,820,738 and 4,720,532.

However, the thermal shock resistance, oxidation resistance and high temperature resistance of pure silicon nitride or carbide are still inadequate for exposure to elevated temperatures and particularly corrosive atmospheres.

It is indeed known that composites of $Si_3N_4$ or SiC and BN produced by mixing and hot pressing of a binary powder have considerably better thermal shock resistance than components made from the pure binary compounds due to the reduced modulus of elasticity. However, the described production methods lead to irregularities which are partially responsible for the low strengths of the composites. Moreover, it is not possible to produce fibres and coatings in this manner.

One possible way of improving the homogeneity of such materials containing boron and silicon and of extending their scope of application is to use preceramic polymers containing boron, so-called polyborosilazanes. Solutions for all the above-stated applications may be provided with polymers containing boron.

The production of polyborosilazanes is disclosed in the patent applications EP-389 084 A2, EP-549 225 A1, EP-536 698 A1, EP-404 503 A1, EP-424 082 A2 and in Chem. Mater. 1993, 5, 547–556.

The production methods described therein all proceed from polyhydridosilazanes which are converted into polyborosilazanes by copolymerisation with a soluble organoboron compound. However, the processes naturally do not give rise to an absolutely homogeneous distribution of the boron in the polysilazane matrix, as a polymer is used as starting material which is retained as a block during the reaction with the boron compound. Consequently, during pyrolysis, the SiN(C) functions or BN functions crosslink primarily with the same species, with the result that larger SiN(C) units are present in the pyrolysed ceramic material alongside hexagonal, turbostratic BN(C). These irregularities in turn result in deficient thermal and mechanical properties. Furthermore, the organoboron compounds used are not available on an industrial scale and are prohibitively expensive.

A further disadvantage of these polymers is their lack of stability over moderately long storage at room temperature due to progressive crosslinking. After a short period these block copolymers containing hydridosilazane become infusible or insoluble.

DE-A 41 07 108 describes polyborosilazanes or molecularly disperse ceramic materials which are produced by ammonolysis of the molecular single-component precursors $Cl_3Si$—NH—$BCl_2$(TADB) or $(Cl_3Si$—$NH)_2$—BCl (TACB) and subsequent pyrolysis. In this case, homogeneity on an atomic level is ensured by the precursor molecules having intrinsic (Si—N—B) bonds, which are retained through the subsequent ammonolysis and pyrolysis. The structural homogeneity of the polymeric preceramics and of the ceramic materials is moreover ensured by the first coordination sphere of both the Si and B atoms consisting solely of nitrogen after the ammonolysis stage. This is achieved by the Si or B atoms in the molecules each being bonded solely to N or Cl. On ammonolysis with ammonia or amines, the chlorine atoms are then each replaced by nitrogen. Stable, soluble and fusible polyborosilazanes are obtained by ammonolysis with methylamine. Pyrolysis of these polymers results in a ceramic yield of approximately 70%. This value is relatively low and is surpassed by 10–15% by the perhydropolysilazanes according to U.S. application Ser. No. 4,397,828. The poor ceramic yield is principally disadvantageous in applications as an injection moulding material or in use as a matrix for composite components.

The object of this invention is to provide a process for producing polyborosilazanes which have a ceramic yield of >80% and the pyrolysis of which gives rise to ceramic materials with a homogeneous distribution of silicon and boron on an atomic level.

It has surprisingly now been found that ammonolysis of mixtures of (1) molecular silane compounds containing chlorine of the formula SiCl $(R_1,R_2,R_3)$, wherein $R_1,R_2$ and $R_3$ mutually independently mean Cl, H, $C_1$-$C_6$ alkyl, phenyl, vinyl, alkylamino or alkylsilyl and (2) the boron containing compound $Cl_3Si$—NH—$BCl_2$, with organylamino compounds of the $HNZ_2$ type, wherein Z means H, $C_1$-$C_6$alkyl, vinyl or phenyl, gives rise to novel polyborosilazanes which are homogeneous at the atomic level. Depending upon the silane compound used, the borosilazanes according to the invention may also have (Si—C) and (Si—H) bonds in addition to (Si—N—B) bonds. These preceramic polymers have a ceramic yield on pyrolysis of >80%.

According to the present invention, the processes which have been described above lead to new polyborosilazanes, which have the structural feature Si—N—B, wherein each boron atom is only bonded to nitrogen and silicon atoms are bonded to at least two nitrogen atoms wherein the remaining coordination sites may instead consist of hydrogen and/or carbon.

In a preferred embodiment, the atomic ratios are as follows:

N/Si: 0.2–4,

B/Si: 0.05–1.5,

O/Si: at most 0.2,

C/Si: at most 1.5 and

H/Si: at most 20.

The present invention also provides a process for the production of the oligo- or polyborosilazane compounds in which a mixture of $Cl_3Si$— NH—$BCl_2$ with molecular silane compounds containing chlorine of the formula $ClSi(R_1,R_2,R_3)$, wherein $R_1,R_2$ and $R_3$ mutually independently mean Cl, H, $C_1$–$C_6$ alkyl, phenyl, vinyl, alkylamino or alkylsilyl, is subjected to ammonolysis.

Compounds are preferred which have similar or identical rates of ammonolysis, such as TADB and TACB. This is necessary in order to obtain a homogeneous polymer and ultimately a homogeneous ceramic.

The component containing boron (TADB or TACB) may be mixed with one or more of the stated components containing only Si in any desired ratio, depending upon the desired B to Si ratio and the C to N ratio in the resultant ceramic. Molar ratios of Si to B of between 10:1 and 1:1 and (C:N) ratios of between 10:1 and 1:10 are preferred.

Ammonolysis of the mixtures produced in this manner to yield monomeric, oligomeric or polymeric borosilazane compounds may be performed with ammonia, primary or secondary alkylamines or aromatic amines or mixtures of the stated ammonolysis reagents.

Ammonolysis is preferably performed with ammonia, primary or secondary alkylamines or other amines having the formula $HNZ_2$ or mixtures of the stated compounds, wherein Z means $C_1$–$C_6$alkyl, phenyl or vinyl.

All known ammonolysis processes may be used for this reaction; this includes reaction with solid or liquid ammonia or organyiamine at low temperatures and reaction with gaseous ammonia or amines in an organic solvent or pure. Solvents which may be used are, for example, hexane, toluene, methylene chloride, pyridine or THF. The hydrochlorides arising in these reactions, which are insoluble inter alia in organic solvents may be separated from the desired product by a filtration or sublimation stage.

A further ammonolysis process according to the invention is characterised in that the mixtures are first reacted with methylamine and then, after removal of the hydrochloride formed, the oligomeric reaction product is further crosslinked by being reacted again with TADB or a molecular silane compound containing chlorine of the formula $ClSi(R_1,R_2,R_3)$, wherein $R_1,R_2$ and $R_3$ mutually independently mean Cl, H, $C_1$–$C_6$ alkyl, phenyl, vinyl, alkylamino or alkylsilyl, at temperatures of between −80 and +100° C. In order to eliminate any chlorine functions which are not yet ammonolysed, gaseous or liquid ammonia is once more introduced into the reaction solution at temperatures of between −80° C. and +60° C. Any possibly formed ammonium chloride is separated out and, if necessary, the solvent is removed from the filtrate.

Borosilazanes occurring as monomers or oligomers may be crosslinked without pressure or under elevated pressure, thermally and/or using a crosslinking reagent. The polyborosilazane compounds are preferably obtained by polymerising the stated borosilazane compounds by thermal polymerisation or by reaction with crosslinking reagents such as ammonia, KH, thionyl chloride or alkylammonium salts in open or closed systems under standard or elevated pressure.

Crosslinking may also proceed by irradiation with high-energy electromagnetic waves or with elementary particles.

Depending upon the precursor mixture, ammonolysis (ammonia, primary amine or secondary amine) and crosslinking agent used, the consistency of the resultant polyborosilazanes according to the invention ranges from liquid to resinous or waxy up to a highly crosslinked solid state.

The polymerisation temperature is between −20° C. and 300° C. and the duration of polymerisation between 5 minutes and 10 days. Polymerisation proceeds by elimination of amine residues and/or of hydrogen to yield new (Si—N—B), (Si—N—Si) or (B—N—B) bonds.

The average molecular weight of the products is between 200 and 200,000 g/mol depending upon the degree of crosslinking and the precursor mixture used. Stable, soluble preceramic polyborosilazanes consisting solely of silicon, boron, nitrogen and hydrogen may, for example, be obtained by reacting a mixture of one part of TADB with 4–6 parts of $SiH_2Cl_2$ with ammonia in an organic solvent.

The present invention also provides a process for the production of a ceramic material, wherein the oligomeric or polymeric borosilazane compounds are pyrolysed in an atmosphere which is inert or contains $NH_3$ at temperatures of 600 to 2000° C., preferably between 1200 and 1600° C.

The ceramic yields from pyrolysis are between 81% and 95%. The pyrolysis product according to the invention is a ceramic material, over 98% of which consists of Si, B, N and C and has (Si—N—B) bonds. The material is also characterised by the following atomic ratios:

N/Si: 0.2–4

B/Si: 0.01–1.5

O/Si: 0.2 or less

C/Si: 1.5 or less

H/Si: 0.05 or less.

The ceramic pyrolysis products are generally amorphous, but may also be crystalline. The type and quantity of the crystalline phases are dependent upon the composition of the precursor mixture and upon the pyrolysis gas and temperature used. The following crystalline phases may occur: $Si_3N_4$, SiC, BN and $B_4C$. In the amorphous state, the distribution of elements in the ceramic material is homogeneous on the molecular scale. After crystallisation, which occurs inter alia at temperatures of above 1600° C., the individual phases are present as segregated nanocrystals. In this case, there is a homogeneous distribution of elements at least down to a lateral dimension of 0.5 μm.

In pyrolysis products with a molar Si:B ratio of between 4:1 and 1:1, the amorphous state is retained up to at least 1800° C. At higher (Si:B) ratios, crystallisation begins at progressively lower temperatures. At (Si:B) ratios of >50:1 the boron fraction has no further detectable influence upon the crystallisation temperature.

The thermal stability of the ceramic materials made from the polyborosilazanes according to the invention is dependent upon the carbon and boron content. Low carbon and boron contents result in a thermal stability which is approximately comparable with the thermal stability of silicon nitride, high carbon and boron contents result in a thermal stability which is comparable with the thermal stabilities of silicon carbide, boron nitride and boron carbide. Ceramic materials made from carbon-free polyborosilazanes with (Si:B) ratios of ≦10:1 have higher thermal stability than pure silicon nitride.

Since some of the polyborosilazanes according to the invention are fusible and soluble in many organic solvents, they may be processed as a melt or solution into suitable semi-products or mouldings, such as for example fibres, coatings, films and monolithic ceramic components. High viscosity polyborosilazanes may also be directly shaped into mouldings by injection moulding or extrusion.

The present invention also provides the use of the oligomeric or polymeric borosilazane compounds for the production of ceramic fibres, ceramic coatings and ceramic mouldings, as a binder for the production of sinterable green compacts and as a matrix or filler material for the production of composite materials containing ceramics, together with the use of the ceramic materials according to the invention for the production of ceramic mouldings and ceramic coatings.

The invention is illustrated with the following examples, which should not be considered as limiting the invention.

EXAMPLES

EXAMPLE 1

Approximately 400 ml of methylene chloride are introduced in a 1l three-necked flask. Approximately 45 g of dichlorosilane are condensed in the flask at −30° C. and 15 g of $Cl_3Si$—NH—$BCl_2$ are injected. Ammonia is then introduced at a rate of 300 cm3/min, so raising the temperature to −5° C.

After introducing ammonia for 3 hours, the reaction is complete, which may be discerned by the temperature falling back down to −30° C. The temperature of the mixture is then allowed to rise to room temperature and the suspension of polyborosilazane, $NH_4Cl$ and methylene chloride is stirred for approximately 1 hour further. Once the residue has been filtered out, it is washed a further 3–4 times with methylene chloride in order to transfer any product adhering to the $NH_4Cl$ into the liquid phase.

After removal of the solvent, 28 g of a solid, carbon-free polyborosilazane is obtained which is still soluble in hydrocarbons after ageing at room temperature for a period of 6 weeks. Pyrolysis at up to 1400° C. in nitrogen gives a ceramic yield of approximately 92%. The pyrolysate has a boron content of approximately 3.2 wt. % and a carbon content of 0.1 wt. %.

Temperature-dependent X-ray measurements made under a vacuum on the borosilicon nitride obtained in this manner show X-ray signals for α-silicon nitride at approximately 1750° C. Diffraction patterns of other phases were not observed.

EXAMPLE 2

Approximately 400 ml of methylene chloride are introduced in a 1l three-necked flask. Approximately 55 g of trichlorosilane are condensed in the flask at −30° C. and 47 g of $Cl_3Si$—NH—$BCl_2$ are injected. A 1:2 mixture of ammonia and methylamine is then introduced at a rate of 300 cm3/min, so raising the temperature to −10° C.

After introducing the ammonia and methylamine mixture for 3 hours, the reaction is complete, which may be discerned by the temperature falling back down to −30° C. The temperature of the mixture is then allowed to rise to room temperature and the suspension of polyborosilazane, $NH_4Cl$, $CH_3NH_3Cl$ and methylene chloride is stirred for approximately 1 hour further. Once the residue has been filtered out, it is washed a further 3–4 times with methylene chloride in order to transfer any product adhering to the salt into the liquid phase.

After removal of the solvent, 56 g of a solid polyborosilazane is obtained which is soluble in hydrocarbons and is fusible (135° C.) and, on pyrolysis at up to 1400° C. in nitrogen, gives a ceramic yield of approximately 84%. The pyrolysate has a boron content of approximately 5.1 wt. % and a carbon content of approximately 8 wt. %. Temperature-dependent X-ray measurements made under a vacuum on the borosilicon carbonitride obtained in this manner show the occurrence of α-silicon nitride X-ray signals from approximately 1820° C. Diffraction patterns of other phases were not observed.

EXAMPLE 3

100 ml of methylamine are condensed at −78° C. into an evacuated 500 ml three-necked flask with a 500 ml dropping funnel without a pressure compensation tube. 10 g of a 2:1:1 mixture of $Cl_3Si$—NH—$BCl_2$, dichlorosilane and trichlorosilane in 250 ml of petroleum ether are added while the mixture is vigorously stirred in such a manner that the internal temperature does not rise above −20° C. The solid, which substantially consists of methylamine hydrochloride, is filtered out with a reverse sintered filter. The solvent is stripped out of the clear petroleum ether solution. A colourless, viscous oil remains (7 g).

EXAMPLE 4

5 g of the oil obtained from example 3 are heated in a 50 ml flask under a protective gas to approximately 50° C. Gaseous ammonia is then passed through the liquid at a rate of 4 ml/min. A glassy, clear, soluble polymer with a melting point of 180° C. is produced within two hours. This polymer is then pyrolysed under nitrogen at 1400° C. A black powder is produced with a boron content of 7 wt. % and a carbon content of 9.4%. The yield of ceramic material is approximately 85%.

Temperature-dependent X-ray measurements made on the borosilicon carbonitride obtained in this manner show the occurrence of m silicon nitride X-ray signals from approximately 1900° C. Nanocrystalline β-SiC is additionally present from approximately 2000° C. Diffraction patterns of other phases were not observed.

EXAMPLE 5

100 ml of the solution of borosilazane obtained from example 3 are reacted with 2 g of dichloromethylsilane at 20° C. and the reaction solution stirred for two hours at this temperature. Ammonia is then introduced to saturation. The resultant ammonium chloride is removed and the solvent drawn off. 3 g of a solid polyborosilazane is obtained as the residue, which is soluble in hydrocarbons and melts at 85° C. On pyrolysis in nitrogen, a ceramic yield of 81% is achieved (elemental analysis: Si: 39.1%, B: 4.3%, N: 43.4%, C: 12.3%).

I claim:

1. Process for the production of oligo- or polyborosilazane compounds wherein a mixture of: (1) $Cl_3Si$—NH—$BCl_2$; and (2) one or more molecular silane compounds of the formula $ClSi(R_1,R_2,R_3)$, where $R_1, R_2$ and $R_3$ mutually independently mean Cl, H, $C_1$–$C_6$ alkyl, phenyl, vinyl, alkylamino or alkylsilyl is subjected to ammonolysis.

2. Process according to claim 1, wherein the molecular silane compounds of the formula $ClSi(R_1,R_2,R_3)$ contain at least two chlorine atoms.

3. Process according to claim 1, wherein ammonolysis is performed with ammonia, primary or secondary alkylamines, or other organylamino compounds having the general formula $HNZ_2$, or mixtures thereof, wherein Z means $C_1$–$C_6$ alkyl, phenyl or vinyl.

4. Process according to claim 1, wherein the molecular silane compounds of the formula $ClSi(R_1,R_2,R_3)$ are selected from the group consisting of dichlorosilane, trichlorosilane, dichloromethylsilane or mixtures thereof.

5. Process according to claim 1, wherein ammonolysis is performed with ammonia, primary or secondary alkylamines, or other organylamino compounds having the formula $HNZ_2$, or mixtures thereof, where Z means $C_1$–$C_6$ akyl, phenyl or vinyl.

6. Process for the production of oligo- or polyborosilazane compounds wherein a mixture of (1) $Cl_3Si$—NH—$BCl_2$; and (2) one or more molecular silane compounds of the formula $ClSi(R_1,R_2,R_3)$, where $R_1, R_2$ and $R_3$ mutually independently mean Cl, H, $C_1$–$C_6$ alkyl, phenyl, vinyl, alkylamino or alkylsilyl, a) is subjected to ammonolysis with an amine of the general formula $RNH_2$, wherein R contains carbon, b) the reaction product from a) is again reacted with $Cl_3Si$—NH—$BCl_2$, or with one or more molecular silane compounds of the formula $ClSi(R_1,R_2,R_3)$ or with a mixture of both components, c) the reaction product from b) is reacted under an inert atmosphere with ammonia and any ammonium chloride formed is subsequently separated.

7. Process for the production of a ceramic material or powder, wherein oligomeric or polymeric borosilazane compounds are pyrolyzed in an atmosphere which is inert or contains NH3 at temperatures of between 600° and 2000° C. to produce the ceramic material or powder with a ceramic yield of from 81% to 95%, further wherein said oligomeric or polymeric borosilazane compounds have the structural feature Si—N—B, and in said oligomeric or polymeric borosilazane compounds each boron atom is only bonded to nitrogen and the silicon atoms are bonded to at least two nitrogen atoms and the remaining coordination sites consist of nitrogen, hydrogen and/or carbon, with the proviso that the atomic ratios in the oligomeric or polymeric borosilazane compounds are as follows:

N/Si: 0.2–4,

B/Si: 0.05–1.5,

O/Si: at most 0.2,

C/Si: at most 1.5 and

H/Si: at most 20.

8. Process for the production of a ceramic material or powder according to claim 7, wherein more than 98 wt. % of the ceramic material or powder consists of the elements Si, N, B and C.

9. Process for the production of polyborosilazane compounds according to claim 1, wherein a mixture of: (1) $Cl_3Si$—NH—$BCl_2$; and (2) one or more molecular silane compounds of the formula $ClSi(R_1,R_2,R_3)$, where $R_1, R_2$ and $R_3$ mutually independently mean Cl, H, $C_1$–$C_6$ alkyl, phenyl, vinyl, alkylamino or alkylsilyl, is subjected to ammonolysis to form borosilazane compounds and the borosilazane compounds are then polymerized by thermal polymerization or by reaction with one or more crosslinking reagents selected from the group consisting of ammonia, KH, thionyl chloride and alkylammonium salts.

* * * * *